United States Patent [19]
Goodman

[11] 3,911,610
[45] Oct. 14, 1975

[54] SLIP AND LOCK STOP

[76] Inventor: Harold Thomas Goodman, 106 Lancelot Drive, Franklin, Ind. 46131

[22] Filed: June 19, 1974

[21] Appl. No.: 480,741

[52] U.S. Cl. ................................................. 43/43.1
[51] Int. Cl.² ......................................... A01K 91/00
[58] Field of Search .............. 43/43.1, 44.87, 44.89, 43/44.95, 44.98, 42.36, 42.49; 24/129 B, 129 A, 129 R

[56] References Cited
UNITED STATES PATENTS

| | | | |
|---|---|---|---|
| 363,352 | 5/1887 | Avery | 24/129 B |
| 484,254 | 10/1892 | Settle | 43/43.1 |
| 3,675,276 | 7/1972 | Nuse | 43/42.49 |
| 3,714,923 | 2/1973 | Mariani | 43/17 |

Primary Examiner—Louis G. Mancene
Assistant Examiner—Peter K. Skiff
Attorney, Agent, or Firm—Woodard, Weikart, Emhardt & Naughton

[57] ABSTRACT

A sliding fishing bobber stopping device in the form of a selectively sized piece of plastic stabilene film material, with holes therein for means of attachment to a fishing line at a selected position. The stop provides the capability to control a sliding bobber position and thus the desired fishing depth. Without a stop means, a sliding bobber would slide to any position along a fishing line, as the line runs through an axial hole incorporated in a sliding bobber.

10 Claims, 3 Drawing Figures

SLIP AND LOCK STOP

The prior art for a sliding fishing bobber stop means utilizes a small coiled wire which assembles to a fishing line by means of an axial hole through the coiled wire. The coiled wire is moved along a fishing line, between a fishing reel and a sliding bobber, and stretched to obtain attachment to a fishing line. Stretching is accomplished by holding each end of the coiled wire. When stretched thusly, the mid area of the coiled wire reduces in diameter and seizes a fishing line to some degree. To accomplish movement to a new position along a fishing line, the reduced mid area must be relaxed by pushing the wire ends toward each other. The wire is moved and stretching is repeated. The repeated movement and related stretching actions leads to marginal holding to a fishing line and breaking of the wire; which renders the wire unfit for further use. In addition, stretching the wire to obtain line seizure increases the coiled wire length two to three times its new configuration. This increase in length establishes a stiffened area to the line causing marginal performance of entering a fishing reel, coiling with the fishing line inside the reel and exiting the reel.

Another form of sliding bobber stop is in use today in the form of a piece of plastic having a hole through same at each end. A fishing line is inserted through one end hole, wrapped around the stop body portion between the holes two to three times and inserted through the hole in stop opposite end. In order to move the stop, the two or three line wraps around the body are to be loosened. The loosening and moving, with other fishing articles in place, is found to be practically impossible. If the stop is moved without loosening the line wraps, severe coiling of the line results due to the helix like formation of wrapping the line. The coiling renders the line unusable.

It is therefore the objective of this invention to improve upon the known state of the art for a sliding fishing bobber stop.

An object of this invention is to provide a stop that can be easily moved along a fishing line with no affect to locking qualities and still remain firm in configuration.

Another object of this invention is to provide a stop that can be moved along a fishing line without having to perform other actions upon the stop and line in order to move the stop, such as loosening wraps or stretching, etc.

Another object of this invention is to provide a stop that when moved along a fishing line, no destructive stresses are transmitted to the fishing line.

Another object of this invention is to provide a stop with improved locking capability to a fishing line.

Another object of this invention is to provide a stop with the capability of entering and exiting a fishing reel and a fishing poles line guides, without interruption in function.

For a better understanding of the inventions features and functions, reference is had to the following detailed description of the invention to be read in connection with the accompaning approximately 20 x size drawings, wherein.

Figure 2:
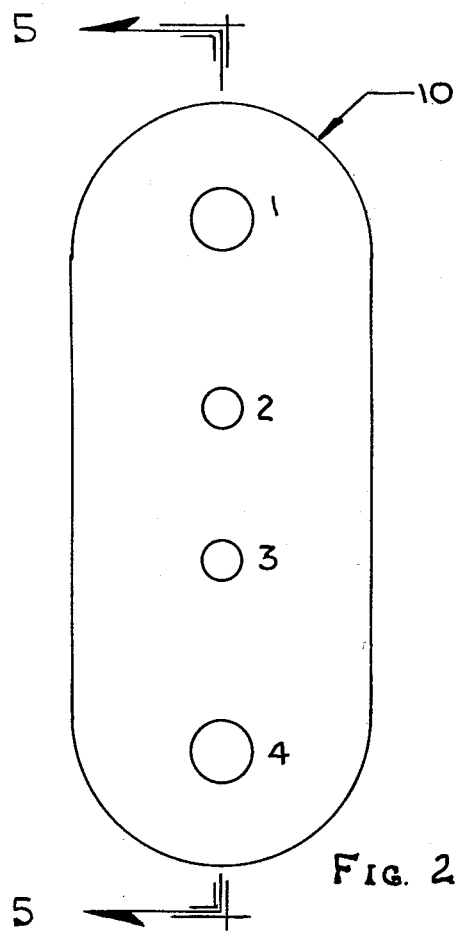
FIG. 2 is a general plan view of the slip and lock stop 10 showing relative position of the holes and geometric shape of stop 10.
Figure 3:
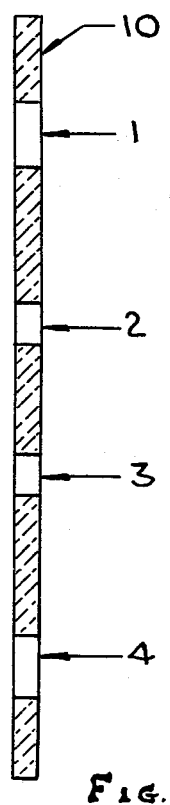

FIG. 3 is a section view of the slip and lock stop 10 taken along line 5—5 of FIG. 2, showing stop 10 thickness and hole relationship.

Figure 1:
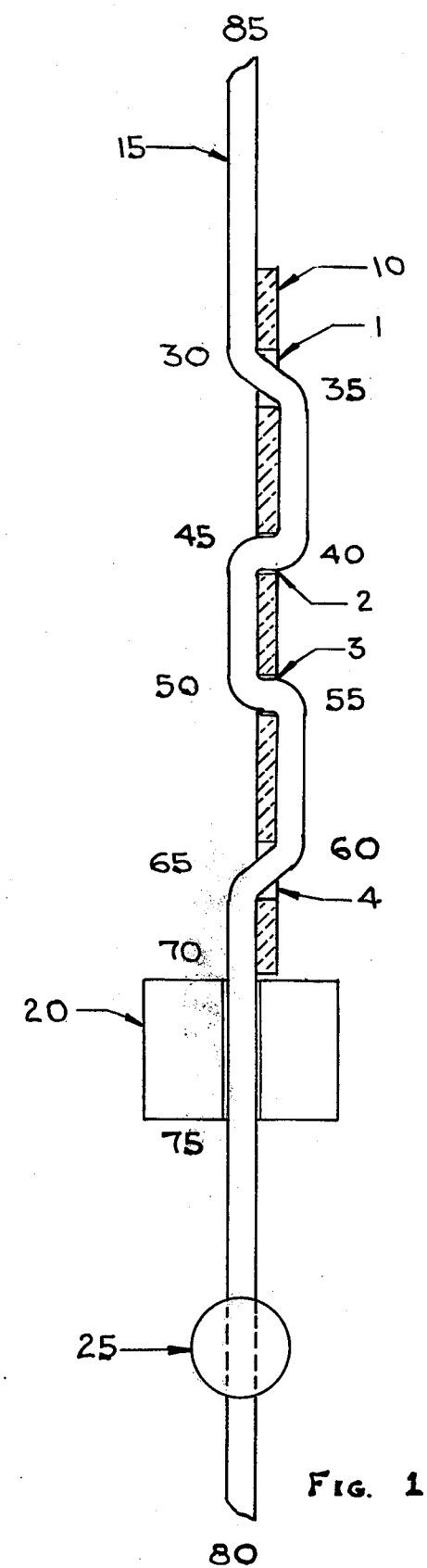
FIG. 1 is a sectional view of the slip and lock stop 10 in accordance with the invention, used in the assembly with companionate fishing gear. The section view of the stop is taken along line 5—5 of FIG. 2.

For the purpose of illustrating the assembly in which the slip and lock stop 10 of the invention is used, there is shown in FIG. 1 the stop 10, a fishing line 15, a sliding bobber means 20 and a sinker means 25 which latter three items form no part of this invention.

With reference to FIG. 1, the "symmetrical" slip and lock stop 10 is slidably received by the fishing line 15 in the following order of assembly, prior to assembly of the sliding bobber means 20 and the sinker means 25.

End 80 of line 15 enters hole 1 of stop 10, at position 30, and exists hole 1 at position 35 in a sewing like action.

End 80 of line 15 reenters stop 10 at hole 2, at position 40, and exists hole 2, at position 45, in a sewing like action.

End 80 of line 15 reenters stop 10 at hole 3, at position 50, and exists hole 3, at position 55, in a sewing like action.

End 80 of line 10 reenters stop 10 at hole 4, at position 60, and exists hole 4 at position 65, thus completing the initial assembly of stop 10 to line 15.

Move stop 10 to a position on line 15 to provide space for assembly of the bobber means 20 and sinker means 25. This movement of stop 10 is a simple single action operation of holding stop 10 between thumb and forefinger and sliding stop 10 along line 15.

Install bobber means 20 to line 15 by entering end 80 of line 15 into bobber means 20, at position 70, and exiting bobber means 20 at position 75.

Install sinker means 25 and fishing hook not shown at position 80, to line 15 commensurate with equipment used. End 85 of line 15 goes to fishing reel, not shown.

The bobber means 20 is now captured on line 15 between stop 10 and sinker means 25, as is intended. To begin fishing action, simply move stop 10 along line 15 by thumb-finger pressure to the anticipated fishing depth. Reel in line 15 with stop 10 into fishing reel, as desired, and cast as per standard method.

As illustrated in FIGS. 2 and 3, holes, 1, 2, 3, and 4 are incorporated through the slip and lock stop 10 and positioned symmetrically inside the body shown in FIG. 2. Holes 1 and 4 are of the same size whose function is to create friction with the fishing line 15, to cause the slip and lock stop 10 to lay parallel to the fishing line 15 as well as to sustain a centered position about line 15. Holes 2 and 3 assist the friction, parallel and centering features, but also has a more important function of causing the stop 10 to maintain a locked in position on line 15. Holes 2 and 3 are of the same size, but reduced in size from holes 1 and 4. Holes 2 and 3 are sized to permit assembly of lines to 10 lb. test (.011 diameter) as they are pierced new through the stop 10.

On lines exceeding 10 lb. test, stop 10 has the flexibility to permit enlargement of holes 2 and 3 to 0.020 diameter, thereby maintaining a close diametrical relation to line size, enhancing locking capability and to permit a wider range of line size usage. The position of holes 1, 2, 3, and 4 lengthwise to the stop 10 is so designed to provide adequate space between them and to discourage damaging change in configuration. For example, when casting the bait into the water the weight of the hook and bait, the sinker means 25 and the bobber means 20 as seen in FIG. 1, a high velocity of movement occurs. As the stop 10 is pulled from the reel and through the pole guides stop 10 is bumped by the sides of the reel exit hole, if closed face reel, and the pole line guides. The potential damage to stop 10 has been minimized to a functional level by keeping the end walls between holes 1 and 4 and stop 10 end extremities to an absolute minimum. The radius contour at stop 10 end extremities provide an adequate leading edge for guiding stop 10 past the obstacles of holes and guides. Stop 10 configuration in this regard is effective enough to permit movement through fly pole line guides without impairing locking and casting features. Thus, use with spincast type fishing poles with larger diameter line guides, for which stop 10 is designed, provides a functional advantage. Enlargement of holes 2 and 3 can be accomplished by means of a fishing hook, a common pin, or needle. Should a fisherman slightly over size either or both of holes 2 and 3 to gain line assembly, lock quality is not impaired. For example, the diameter of holes 2 and 3 as newly pierced are twice the diameter of a 4 lb. test mono-filament fishing line (0.006 diameter) which line locks with stop satisfactorily.

As further illustrated in FIG. 2, the length and width of stop 10 is so designed as to provide adequate structural wall thickness and permitting entrance and exits to aforementioned holes and guides.

As further illustrated in FIG. 3, the thickness of stop 10 is so designed as to permit coiling with a fishing line, inside a fishing reel, and to permit easy cutting through by a piercing die.

In order to provide a quality sliding bobber stop, it is necessary to select a material that is compatible with mono-filament fishing line 15 and highly resistant to shear, tensil, tearing and abrasive forces experienced during its usage. For these reasons, the plastic stabilene film material was chosen.

In preparation for submitting an application for patent of the invention herein, the inventor searched the "OFFICIAL GAZETTE" from period Apr. 16, 1974, back through the year 1963 for the prior art of sliding bobber stops. During this period, only one sliding bobber stop means was found, that being the coiled wire configuration mentioned herein. (Reference U.S. Pat. No. 3,196,575 of July 27, 1965).

What is claimed is:

1. A stop for a bobber sliding on fishing line, said stop comprising:
an elongated flat piece of flexible substantially nonstretchable material having four holes therein substantially aligned in a row, the two end holes in the row being of a diameter greater than the diameter of the largest fishing line with which the stop may be used, and the two intermediate holes being of a diameter smaller than the largest line with which the stop may be used, but larger than the smallest line with which the stop may be used, the thickness of said material and size and spacing of said holes being such as to securely retain by friction said stop in a fixed position on a fishing line threaded through said holes in succession and yet permit a force deliberately applied externally to said line and to said stop by gripping between a finger and thumb to slide said stop endwise along said line.

2. The stop of claim 1 wherein:
the width of said stop is small enough to pass freely through the line guides on a fishing pole and onto and off a reel.

3. The stop of claim 2 wherein:
both ends of said stop are rounded to lead said stop through pole line guides.

4. The stop of claim 1 wherein:
the diameter of the end two holes is approximately 0.020 inch; and
the diameter of the two intermediate holes is approximately 0.012 inch.

5. In a combination of a fishing line, a bobber having a fishing line receiving hole therethrough sufficiently large that the bobber is freely slidable along the line, and a weight attached to the line below the bobber and supportable in water by the buoyancy of the bobber, the improvement comprising:
a bobber stop having a body with at least three holes receiving said line therethrough above the bobber, said body having a dimension transverse to the line greater in size than the line receiving hole in the bobber for abutment of the bobber with the stop to prevent passage of the stop by the bobber, the body engaging the line with friction sufficient to prevent movement of the stop along the line by the bobber independent of external force applied to the bobber in excess of its buoyancy, the friction of engagement being low enough to enable movement of the stop along the line by application of external force to the line and stop in an amount greater than the buoyancy of the bobber.

6. The improvement of claim 5 wherein:
the friction is great enough to prevent movement of the body along the line by inertia of the body resisting linear acceleration thereof by acceleration of the line as by jerking the line.

7. The improvement of claim 5 wherein:
said body is made of elongated thin, flexible, stretchless material unaffected by immersion in water.

8. The improvement of claim 7 wherein the material is "Stabiline" film.

9. The improvement of claim 5 wherein:
the body receives the line through the holes in series whereby the body is movable along the line without twisting the line.

10. The improvement of claim 9 wherein:
the line is a monofilament line, the body has four holes therethrough with the line received through the holes in series and extending beyond the ends of the body without wrapping around the body, the body being flexible to conform to line wound on a reel, and the maximum body dimension transverse to the line being small and rounded at its ends to freely pass through fishing pole line guides.

* * * * *